US012559172B2

(12) United States Patent　　　　　(10) Patent No.:　US 12,559,172 B2
Mauritz et al.　　　　　　　　　　　　　(45) Date of Patent:　　Feb. 24, 2026

---

(54) STEERING AXLE FOR A STEERABLE VEHICLE AND INDUSTRIAL TRUCK

(71) Applicant: ZF Friedrichshafen AG, Friedrichshafen (DE)

(72) Inventors: Wolfgang Mauritz, Fürstenzell (DE); Wolfgang Klinger, Passau (DE); Max Leitner, Immenstaad (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 651 days.

(21) Appl. No.: 17/935,985

(22) Filed: Sep. 28, 2022

(65) Prior Publication Data

US 2023/0159097 A1　　May 25, 2023

(30) Foreign Application Priority Data

Nov. 22, 2021　　(DE) ..................... 10 2021 213 066.6

(51) Int. Cl.
| | |
|---|---|
| B62D 7/08 | (2006.01) |
| B62D 5/04 | (2006.01) |
| B62D 7/16 | (2006.01) |
| B62D 7/18 | (2006.01) |
| B62D 7/20 | (2006.01) |

(52) U.S. Cl.
CPC ............. B62D 7/08 (2013.01); B62D 5/0421 (2013.01); B62D 7/166 (2013.01); B62D 7/18 (2013.01); B62D 7/20 (2013.01)

(58) Field of Classification Search
CPC ........ B62D 5/0421; B62D 7/08; B62D 7/166; B62D 7/18; B62D 7/20
See application file for complete search history.

(56) References Cited

U.S. PATENT DOCUMENTS

| | | | | | |
|---|---|---|---|---|---|
| 4,064,967 | A | * | 12/1977 | Doolittle .................. | B62D 7/12 |
| | | | | | 280/93.506 |
| 7,617,907 | B2 | * | 11/2009 | Mair ....................... | F16C 11/02 |
| | | | | | 180/448 |
| 8,789,646 | B2 | * | 7/2014 | Kim ......................... | B62D 7/20 |
| | | | | | 180/436 |

FOREIGN PATENT DOCUMENTS

| | | | | |
|---|---|---|---|---|
| CN | 1153711 | C | * | 6/2004 |
| CN | 205706845 | U | * | 11/2016 |
| CN | 117565972 | A | * | 2/2024 |
| CN | 118701164 | A | * | 9/2024 |

(Continued)

OTHER PUBLICATIONS

German Patent Office, Office Action issued in German patent application No. 10 2021 213 066.6 (Jun. 13, 2022).

*Primary Examiner* — William C Joyce
(74) *Attorney, Agent, or Firm* — Finch & Maloney PLLC

(57)　　　　　　　ABSTRACT

A steering axle for a steerable vehicle includes an axle housing, a steering motor, a steering gear, a first steering knuckle with a first steering arm, a second steering knuckle with a second steering arm, a coupling rod, a first tie rod, and a second tie rod. The first and second steering arms are each rigidly arranged on a respective steering knuckle that is hinged in the axle housing. The first and second tie rods are each hinged at a first end to a respective steering arm and hinged at a second end to the coupling rod. The steering axle is configured so that the steering motor can set a steering angle of the steering axle via the steering gear. The steering axle has first and second intermediate steering levers, each hinged at its first end to the axle body and hinged at its second end to the coupling rod.

9 Claims, 4 Drawing Sheets

(56)     References Cited

FOREIGN PATENT DOCUMENTS

| DE | 10 2008 028 273 | A1 | | 12/2009 |
| DE | 10 2017 222 887 | A1 | | 6/2019 |
| DE | 10 2019 116 644 | A1 | | 12/2019 |
| JP | 09-226615 | | * | 9/1997 |
| WO | 2019/115152 | A1 | | 6/2019 |

* cited by examiner

STEERING AXLE FOR A STEERABLE VEHICLE AND INDUSTRIAL TRUCK

RELATED APPLICATIONS

This application claims the benefit of and right of priority under 35 U.S.C. § 119 to German Patent Application no. 10 2021 213 066.6, filed on 22 Nov. 2021, the contents of which are incorporated herein by reference in its entirety.

FIELD OF THE DISCLOSURE

The invention relates to a steering axle for a steerable vehicle and to a corresponding industrial truck.

BACKGROUND

Various forms of power steering units are known in the state of the art, which either support a manual steering input from a driver or automatically set a desired steering angle in response to an electrical signal. As a rule, the actuator is either a hydraulic cylinder or an electric motor. In addition to the actuator, these steering units usually include a steering gear of concentric design and feature a shaft as the output. The steering units are constructed like columns with a base in the lower area, which is used for attachment to a chassis of the vehicle. The upper section of the steering unit can be rotated against the lower section in order to be able to set a steering angle on the steerable wheels.

In this context, DE 10 2019 116 644 A1 discloses a power steering unit for vehicles comprising a steering column with a base and an electrically assisted steering apparatus with a housing and an electric motor, the housing being movable relative to the base with respect to one degree of freedom. The steering column, in turn, further comprises a lower axle which is rotatably connected to and partially contained within the base. The electric motor is designed to rotate the lower axis via an output shaft.

SUMMARY

However, the known servo steering units are disadvantageous in that they require a lot of space due to their columnar design and are subject to unfavorable mechanical loads, which in turn can lead to increased wear and premature failure of the servo steering units.

It is an object of the present invention to propose an improved steering axle for a steerable vehicle.

This task is solved according to the invention by the steering axle for a steerable vehicle according to the present disclosure. Advantageous embodiments and further embodiments of the invention are apparent from the present disclosure.

The invention relates to a steering axle for a steerable vehicle, comprising an axle housing, a steering motor, a steering gear, a first steering knuckle with a first steering arm, a second steering knuckle with a second steering arm, a coupling rod, a first tie rod and a second tie rod, wherein the first steering arm is rigidly arranged on the first steering knuckle and the second steering arm is rigidly arranged on the second steering knuckle, wherein the first steering knuckle is mounted steerably in the axle housing, wherein the second steering knuckle is mounted steerably in the axle housing, wherein first tie rod is hinged at a first end to the first steering arm and at a second end hinged to the coupling rod, wherein the second tie rod is hinged at a first end to the second steering arm and at a second end hinged to the coupling rod, and wherein the steering axle is designed in such a way that the steering motor can adjust a steering angle of the steering axle via the steering gear. The steering axle according to the invention is characterized in that the steering axle further comprises a first intermediate steering lever and a second intermediate steering lever, wherein the first intermediate steering lever is hinged at a first end to the axle beam and hinged at a second end to the coupling rod, and wherein the second intermediate steering lever is hinged at a first end to the axle beam and hinged at a second end to the coupling rod.

A steering axle is therefore provided, i.e. an axle with, in particular, two steerable wheels suitable for use on a vehicle. The vehicle is preferably a utility vehicle such as an agricultural machine, a work machine or an industrial truck.

As described, the steering axle initially comprises an axle housing on which all other components of the steering axle are arranged. The axle housing thus represents a kind of basic structure of the steering axle.

Furthermore, the steering axle comprises a steering motor and a steering gear, wherein the steering motor is provided for actuating the steerable wheels of the steering axle, in the sense that the steering motor can adjust a steering angle of the steering axle via the steering gear.

Preferably, the steering motor and the steering gear are arranged in a common housing.

The steerable wheels can advantageously also be driven wheels, in which case a drive unit is provided, which in particular, however, does not have to be part of the steering axle.

The steering motor is preferably a three-phase brushless electric motor.

The steering gear is preferably designed as a planetary gear. Particularly preferably, the steering gear can also include a spur gear stage or traction center stage upstream of the planetary gear.

In addition, the steering axle includes a first steering knuckle having a first steering arm and a second steering knuckle having a second steering arm. A first steerable wheel can be rotatably arranged on the first steering knuckle and a second steerable wheel can be rotatably arranged on the second steering knuckle. The first and second steering knuckles are mounted in the axle housing so that they can be steered, i.e. pivoted about a steering axis. A steering movement of the first steering knuckle can thus be transmitted to the first wheel. Likewise, a steering movement of the second steering knuckle can be transmitted to the second wheel.

The first steering arm is rigidly attached to the first steering knuckle. For example, the first steering arm and the first steering knuckle can be formed in one piece. However, a welded or screwed connection is also conceivable.

In a similar way, the second steering arm is also rigidly attached to the second steering knuckle. For example, the second steering arm and the second steering knuckle can be formed in one piece. However, a welded or screwed connection is also conceivable in this case.

The first steering arm is used to transmit a steering torque of the steering motor to the first steering knuckle, and the second steering arm is used to transmit a steering torque of the steering motor to the second steering knuckle.

The steering axle also includes a first tie rod, a second tie rod, and a coupling rod, wherein the coupling rod is hinged at a respective axial end to a second end of the first tie rod and to a second end of the second tie rod. In other words, the coupling rod is arranged centrally between the tie rods and connects them to each other via a joint in each case. These joints are advantageously swivel or hinge joints with only one degree of freedom.

With a first end, the first tie rod is connected to the first steering arm via a joint and, correspondingly, the second tie rod is connected to the second steering arm via a joint. These joints are also preferably swivel or hinge joints with only one degree of freedom.

As the coupling rod is connected to the first tie rod and the second tie rod in the same way, and these in turn are connected to the first steering arm and the second steering arm respectively, steering movements on the first steering knuckle or first wheel and on the second steering knuckle or second wheel can be set synchronously. Advantageously, the first tie rod, the second tie rod and the coupling rod are designed in such a way that a steering angle at the first steering knuckle or at the first wheel and at the second steering knuckle or at the second wheel are not identical, but together form the so-called Ackermann angle, so that efficient cornering of the steering axle is made possible.

According to the invention, it is now provided that the steering axle further comprises a first intermediate steering lever and a second intermediate steering lever. The first intermediate steering lever is connected to the axle beam at a first end via a joint, and the second intermediate steering lever is connected to the axle beam at a first end via a joint in a similar manner. These are also advantageously swivel or hinge joints with only one degree of freedom. At a second end, the first intermediate steering lever is also connected to the coupling rod via a joint. However, the connection to the coupling rod does not necessarily have to be arranged at one axial end of the coupling rod. Likewise, the second intermediate steering lever is connected to the coupling rod at a second end via a joint. These joints are also preferably designed as swivel or hinge joints with only one degree of freedom.

The first and second intermediate steering levers result in greater mechanical stability of the steering, in particular even under high wheel forces, for example when cornering and during an acceleration or braking process, so that the first steering knuckle and the second steering knuckle always reliably have the desired angle to each other. In addition, the coupling rod and the first and second tie rods can be guided comparatively closer to the axle beam by using the first and second intermediate steering levers, resulting in a smaller space requirement for the steering axle.

According to a preferred embodiment of the invention, it is provided that the steering motor and the steering gear are arranged on the axle housing coaxially with a steering axle of the first steering knuckle, wherein an output shaft of the steering gear is connected to a bearing bolt of the first steering knuckle in a rotationally fixed manner. The steering motor and the steering gear are thus arranged on the steering axle of the first steering knuckle, advantageously above the first steering knuckle. By connecting an output shaft of the steering gear to the first steering knuckle in a rotationally fixed manner, in particular to a bearing pin of the steering knuckle in the axle housing, a rotational movement of the steering motor can be transmitted directly to the first steering knuckle or a steering torque can be introduced into the first steering knuckle. The steering torque can be transmitted to the second steering knuckle via the tie rods and the coupling rod. This represents a space-saving form of formation of the invention.

According to an alternatively preferred embodiment of the invention, it is provided that the steering motor is arranged on the axle housing coaxially with a steering axis of the first steering knuckle and that the steering gear is arranged in the first steering knuckle, an output shaft of the steering motor being connected in a rotationally fixed manner to an input shaft of the steering gear. This results in a particularly space-saving form of the invention, since the steering gear is arranged completely within the first steering knuckle. In other words, the steering gear constitutes the first steering knuckle, so that a housing of the steering gear is correspondingly designed to be rotatably held in the axle housing via bearings. Furthermore, the housing of the steering gear correspondingly has a steering arm, which can be cast on, for example, and a shaft section for receiving a wheel.

Advantageously, the housing represents the output of the steering gear.

According to another alternatively preferred embodiment of the invention, it is provided that the steering motor is arranged on the axle housing parallel to a steering axle of the first steering knuckle and that the steering gear is arranged in the first steering knuckle, an output shaft of the steering motor being connected to an input shaft of the steering gear via an intermediate gear. This form of training is also extremely space-saving. In this case, however, the steering motor is not arranged coaxially above the steering gear, but axially offset from it. Depending on the installation conditions in a specific vehicle, this form of training may be comparatively more suitable than other forms of training. The axial offset between the motor shaft of the steering motor and the input shaft of the steering gear is bridged by an intermediate gear, which can be designed, for example, as a spur gear stage, a belt drive or a chain drive.

In addition, a certain reduction can already be achieved via the intermediate gear, so that the actual steering gear in the steering knuckle can have a comparatively more compact and simpler design.

According to another alternatively preferred embodiment of the invention, it is provided that the steering motor and the steering gear are arranged on the axle housing in such a way that an axis of rotation of an output shaft of the steering gear is identical to an axis of rotation of the first intermediate steering lever, the output shaft being connected to the first intermediate steering lever in a rotationally fixed manner. This means, therefore, that the steering motor and the steering gear are arranged in the area of the first intermediate steering lever so that the first intermediate steering lever can be rotated along its axis of rotation by the output shaft of the steering gear. In this case, the steering torque of the steering motor is transmitted via the first steering arm to the coupling rod and from there via the first or second tie rod to the first or second steering knuckle.

Preferably, the steering motor and the steering gear are arranged entirely within the axle housing, which in turn results in a particularly space-saving embodiment of the invention.

According to another alternatively preferred embodiment of the invention, it is provided that the steering axle further comprises a steering lever and the steering motor and the steering gear are arranged centrally on the axle housing, wherein the steering lever is connected at a first end in a rotationally fixed manner to an output shaft of the steering gear so that it can be pivoted about an axis of rotation of the output shaft, and is connected at a second end in an articulated manner to the coupling rod. In this case, the steering motor actuates the steering lever via the steering gear, which then transmits the steering movement or steering torque to the coupling rod. The coupling rod in turn transmits the steering movement or steering torque to the tie rods, which in turn transmit it to the first or second steering knuckle. Since the steering motor and the steering gear are therefore arranged centrally in the axle housing in this case, this also results in comparatively high steering efficiency.

Preferably, the steering motor and the steering gear are again arranged completely within the axle housing, which also results in a particularly space-saving embodiment of the invention in this case.

According to another particularly preferred embodiment of the invention, it is provided that the coupling rod is designed in two parts, a first part of the coupling rod being articulated to a second part of the coupling rod and to the steering lever via a common articulation point. The coupling rod is therefore not rigid, but it has a joint in its axial center which connects both parts of the coupling rod and on which the steering lever also engages. These joints are advantageously swivel or hinge joints with only one degree of freedom.

According to a further preferred embodiment of the invention, it is provided that at least the first tie rod has at least partially a circular arc shape. This has the advantage that comparatively larger steering angles can be set on the steering axle, since the circular arc shape means that the tie rods can be guided around the respective steering knuckle during a steering movement and do not strike against it. This is particularly advantageous if the first steering knuckle includes the steering gear, as the steering gear generally results in an increased diameter of the first steering knuckle.

According to another preferred embodiment of the invention, it is provided that the first intermediate steering lever has at least partially a circular arc shape and that the second intermediate steering lever has at least partially a circular arc shape, wherein a circular outer side of the first steering lever faces a circular outer side of the second steering lever. This means, therefore, that the intermediate steering levers—like the tie rods—also have a bend that essentially corresponds to an arc of a circle.

Since the first and second intermediate steering levers are each connected to the axle beam by their first ends in an articulated manner, advantageously at the level of the coupling rod, it is generally necessary to provide recesses in the axle beam in which the first ends of the first intermediate steering lever and the second intermediate steering lever can be arranged. The recesses can be milled recesses, for example. The milled recesses must be large enough to allow swiveling movements of the first and second intermediate steering levers, such as occur during a steering movement and the associated axial displacement of the coupling rod. Since the second end of each of the first and second intermediate steering levers is articulated to the coupling rod, they follow the displacement of the coupling rod with a pivoting movement. The arc-shaped design of the first and second intermediate steering levers means that the required recesses can be made comparatively smaller, which shortens a corresponding milling process, for example, and the stability of the axle beam is weakened less.

According to an alternatively preferred embodiment of the invention, it is provided that the first intermediate steering lever is designed as a rigid articulated lever and that the second intermediate steering lever is designed as a rigid articulated lever, wherein an articulation tip of the first intermediate steering lever faces an articulation tip of the second intermediate steering lever. For the purposes of the invention, a rigid articulated lever is understood to be a lever, namely an intermediate steering lever, which is not simply straight but consists of two straight sections connected to each other at a certain angle. The intermediate steering lever thus has a kink at the angular connection point. For example, the kink can be a right angle. Advantageously, the kink has an angle between 90° and 180°.

The design of the first and second steering levers as articulated levers leads to the same advantages as the design with a circular arc shape.

The invention further relates to an industrial truck comprising a steering axle according to the invention. This means that the advantages already mentioned in connection with the steering axle according to the invention also apply to the industrial truck according to the invention.

BRIEF DESCRIPTION OF THE DRAWINGS

The invention is explained below by way of examples of embodiments shown in the figures.

It shows.

DETAILED DESCRIPTION

Identical objects, functional units and comparable components are designated with the same reference signs across all figures. These objects, functional units and comparable components are designed identically with regard to their technical features, unless explicitly or implicitly stated otherwise in the description.

Figures 1A, 1B:
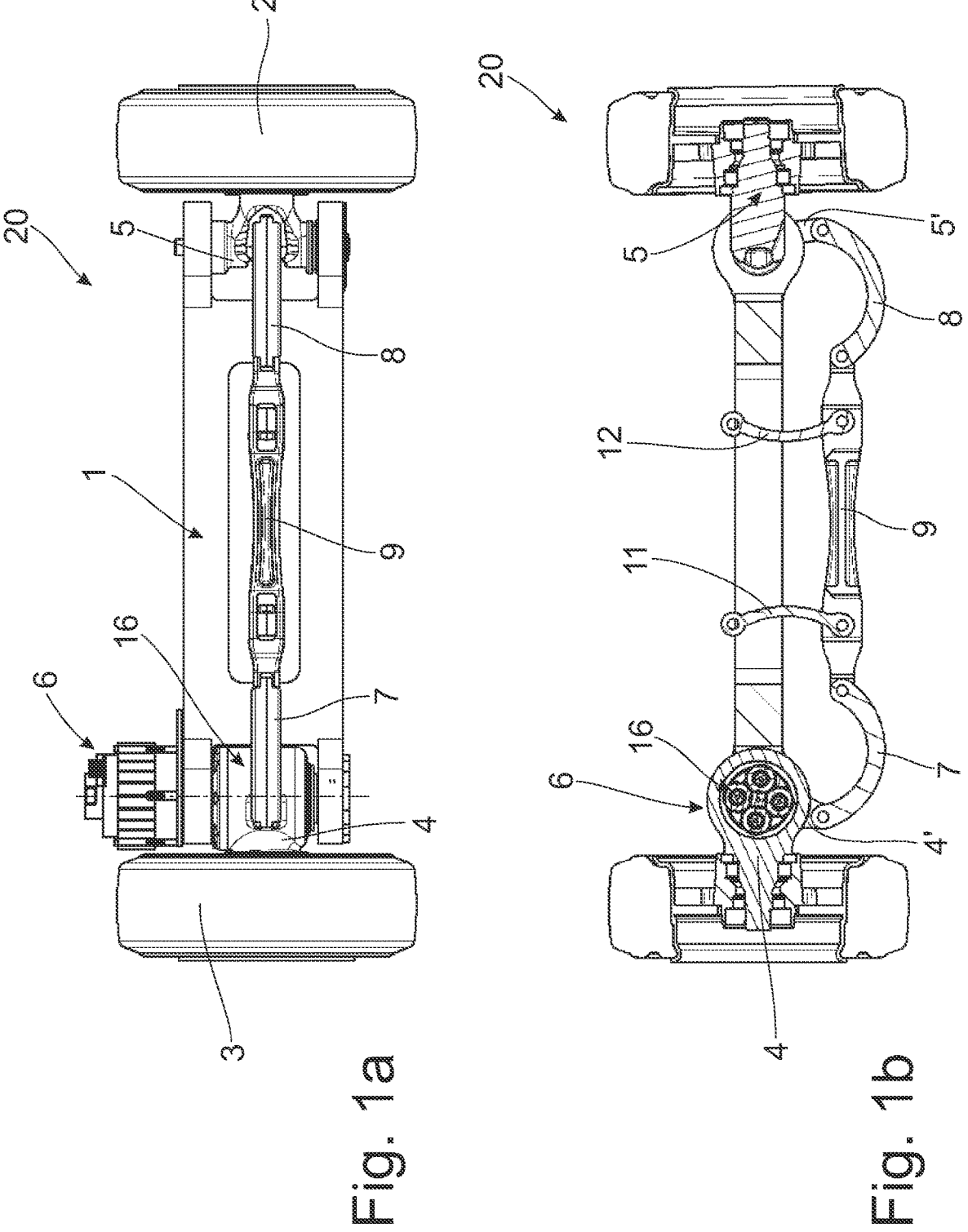
FIGS. 1a and 1b: examples of a possible form of a steering axle according to the invention for a steerable vehicle.

FIG. 1 (including FIGS. 1a and 1b) shows an example embodiment of a steering axle 20 for a steerable vehicle (not shown in FIG. 1), according to one embodiment. FIG. 1a shows a section from the front and FIG. 1b shows a section from above. The steering axle 20 comprises an axle housing 1, a steering motor 6 a steering gear 16, a first steering knuckle 4 with a first steering arm 4', a second steering knuckle 5 with a second steering arm 5', a coupling rod 9, a first tie rod 7, a second tie rod 8, and a first steerable wheel 3 and a second steerable wheel 2.

The first steering arm 4' is rigidly arranged on the first steering knuckle 4, likewise the second steering arm 5' is rigidly arranged on the second steering knuckle 5, the first steering knuckle 4 being mounted steerably in the axle housing 1 and the second steering knuckle 5 also being mounted steerably in the axle housing 1. The first tie rod 7 is articulated at a first end to the first steering arm 4' and at a second end to the coupling rod 9. In identical fashion, the second tie rod 8 is hinged at a first end to the second steering arm 5' and hinged at a second end to the coupling rod 9.

As can further be seen in FIG. 1, the steering motor 6 is arranged coaxially to a steering axis of the wheel 3 or the first steering knuckle 4. In addition, the steering gear 16 is arranged in the first steering knuckle 4. This results in a very space-saving form of the steering axle according to the invention. Since the steering gear 16 is arranged in the first steering knuckle 4, the first steering knuckle 4 accordingly also represents a housing of the steering gear 16. The housing or the first steering knuckle are also an output shaft of the steering gear 16. An input shaft of the steering gear 16, on the other hand, is non-rotatably connected to a motor shaft of the steering motor 6.

As can be seen in FIG. 1, the first tie rod 7 and the second tie rod 8 each have a circular arc shape. This makes it mechanically possible for comparatively larger steering angles to be set on the steering axle 20, since the circular arc shape allows the first and second tie rods 7, 8 to be guided around the respective steering knuckles 4, 5 and not to strike against them. This is particularly advantageous for the first steering knuckle 4, since the first steering knuckle 4 includes the steering gear 16 and thus has an increased diameter.

The steering axle 20 further comprises a first intermediate steering lever 11 and a second intermediate steering lever 12, the first intermediate steering lever 11 having a first end hinged to the axle body 1 and a second end hinged to the coupling rod 9. Similarly, the second intermediate steering lever 12 is hinged to the axle body 1 at a first end and is hinged to the coupling rod 9 at a second end.

The first intermediate steering lever 11 and the second intermediate steering lever 12 each have a circular arc shape, with a circular outer side of the first intermediate steering lever 11 facing a circular outer side of the second intermediate steering lever 12. Since the first and second intermediate steering levers 11, 12 are each connected to the axle beam 1 in an articulated manner at the level of the coupling rod 9 with their first end, corresponding recesses are provided in the axle beam 1, in which the first ends of the first intermediate steering lever 11 and the second intermediate steering lever 12 are arranged. The recesses are, for example, milled recesses. The milled recesses must be large enough to also permit pivoting movements of the first and second intermediate steering levers 11, 12, such as occur during a steering movement and the associated axial displacement of the coupling rod 9. The circular arc design of the first and second intermediate steering levers 11, 12 means that the required recesses can be made comparatively smaller.

The steering motor 6 can drive an input shaft of the steering gear 16 via its motor shaft, which then steers or pivots the first steering knuckle 4. The steering movement is then transmitted to the second steering knuckle 5 via the first and second steering arms 4' and 5', via the first and second tie rods 7 and 8, and via the coupling rod 9. Thus, the steering motor 6 can adjust a steering angle of the steering axis 20.

Figures 2A, 2B:
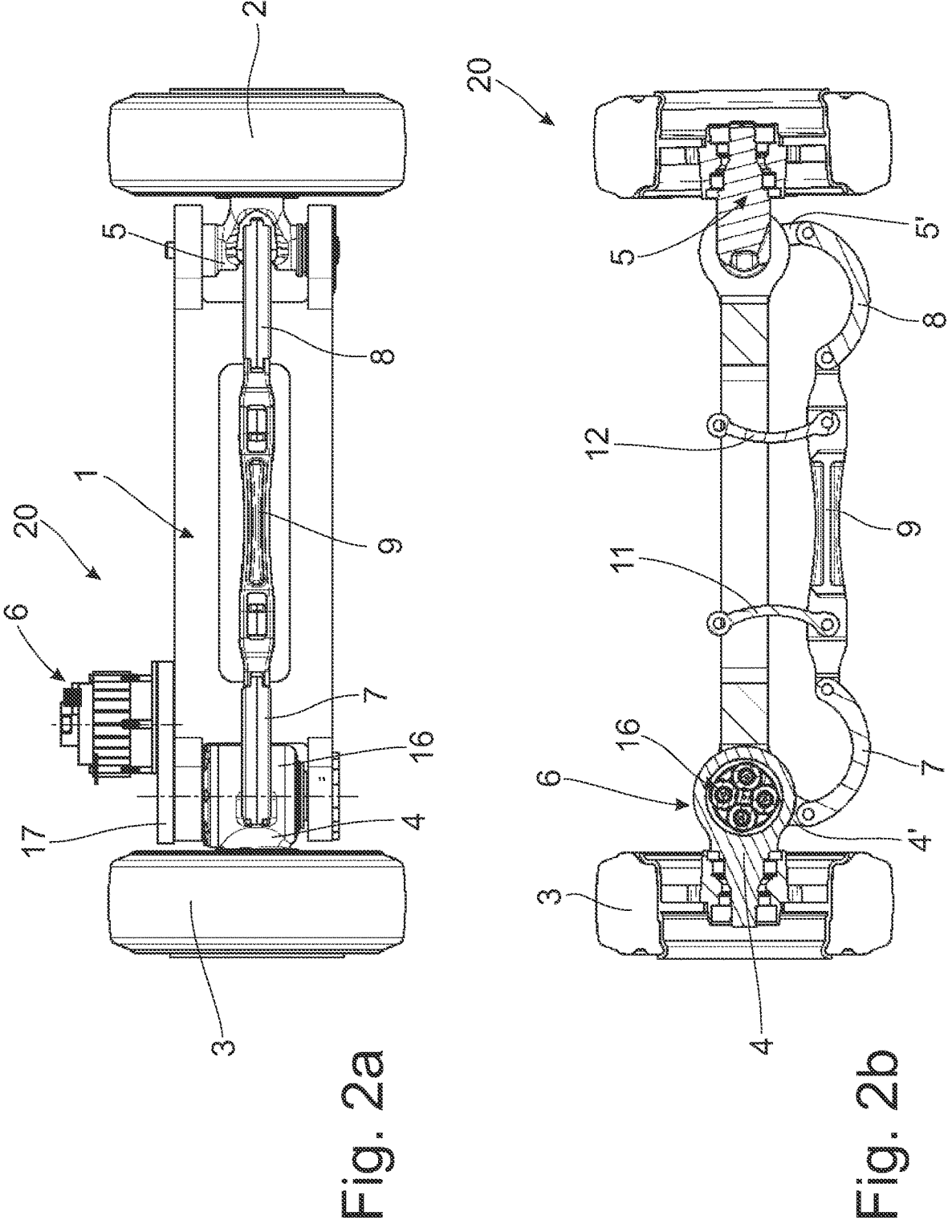
FIGS. 2a and 2b: examples of a further possible design of a steering axle according to the invention.

FIG. 2 (including FIGS. 2a and 2b) shows an example of a further possible design of a steering axle 20 according to the invention. FIG. 2a shows a section of the steering axis 20 from the front and FIG. 2b shows a section of the steering axis 20 from above. The steering axle 20 of FIG. 2 differs from the steering axle 20 of FIG. 1 exclusively in the arrangement of the steering motor 6. In contrast to FIG. 1, the steering motor 6 is not arranged coaxially on the steering axis of the first steering knuckle 4, but it is offset in parallel in the direction of the center of the axle beam 1. The parallel offset is compensated, for example, by a spur gear stage 17 as an intermediate gear 17, which at the same time effects a speed reduction.

Figures 3, 4:
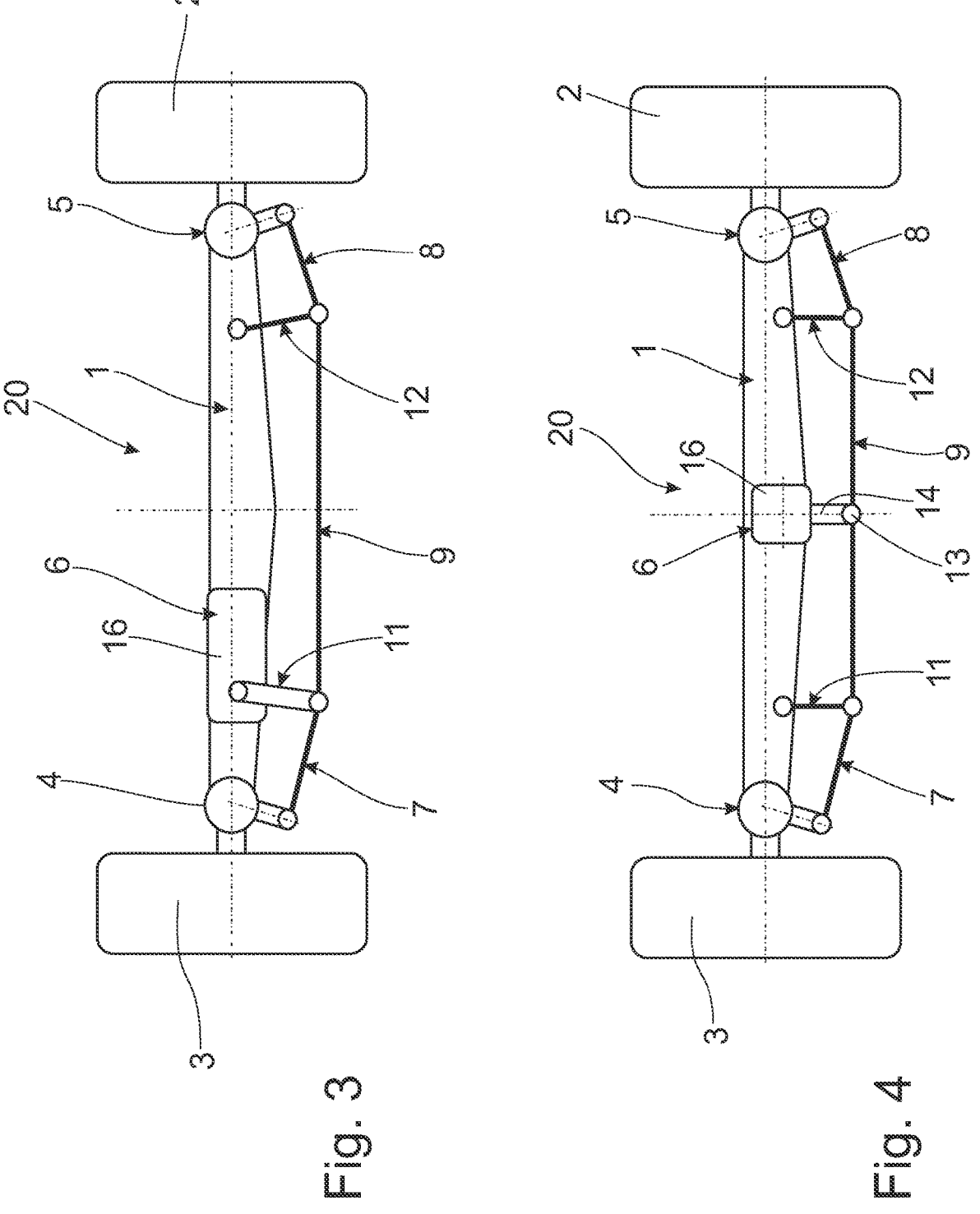
FIG. 3: example and schematic of a further possible design of a steering axle according to the invention.
FIG. 4: example and schematic a further possible design of a steering axle according to the invention

FIG. 3 shows an example and schematic of a further possible design of a steering axle 20 according to the invention. The steering axis 20 of FIG. 3 differs from the steering axis 20 of FIG. 1 again in the arrangement of the steering motor 6. As can be seen, the steering motor 6 and the steering gear 16 are arranged on the axle housing 1 in such a way that an axis of rotation of an output shaft of the steering gear 16 is identical to an axis of rotation of the first intermediate steering lever 11, the output shaft being connected to the first intermediate steering lever 11 in a rotationally fixed manner. The steering motor 6 thus directly actuates the first intermediate steering lever 11 via the steering gear 16, which in turn then acts on the first tie rod 7 and the coupling rod 9 and can thus set a steering angle.

FIG. 4 shows an example and schematic of a further possible design of a steering axle 20 according to the invention. The steering axis 20 of FIG. 4 also differs from the steering axis 20 of FIG. 1 again in the arrangement of the steering motor 6. According to the example in FIG. 4, the steering motor 6 together with the steering gear 16 is arranged axially centrally on the axle housing 1, with a steering lever 14 also being provided. At a first end, the steering lever 14 is connected to an output shaft of the steering gear 16 in a rotationally fixed manner so that it can be pivoted about an axis of rotation of the output shaft, and at a second end, the steering lever 14 is connected to the coupling rod 9 in an articulated manner. Thus, the steering lever 14 is operated directly by the steering motor 6 via the steering gear 16.

Figure 5:
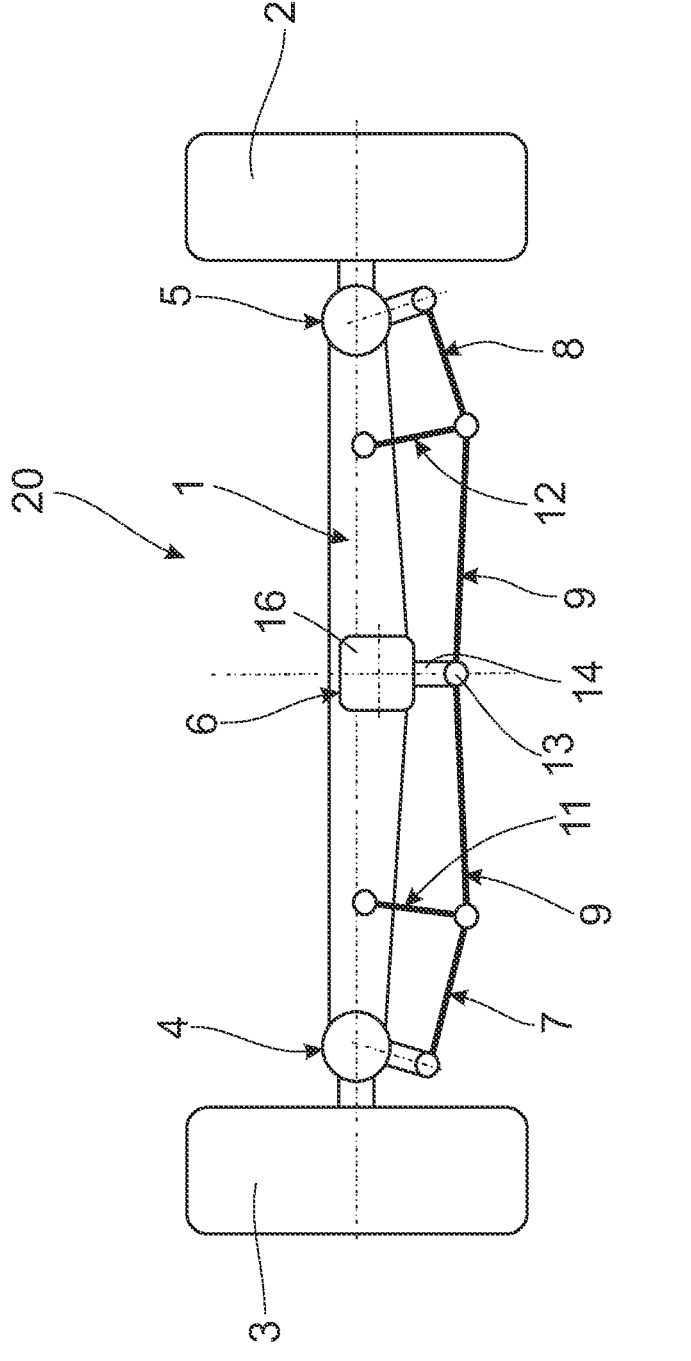
FIG. 5: example and schematic of a further possible design of a steering axle according to the invention.

FIG. 5 shows an example and schematic of a further possible design of a steering axle 20 according to the invention. The steering axle 20 of FIG. 5 differs from the steering axle 20 of FIG. 4 in that the coupling rod 9 is designed in two parts, a first part of the coupling rod 9 being connected in an articulated manner to a second part of the coupling rod 9 and to the steering lever 14 via a common joint 13.

LIST OF REFERENCE NUMERALS

1 Axle housing
2 Second wheel
3 First wheel
4 First steering knuckle
4' First steering arm
5 Second steering knuckle
5' Second steering arm
6 Steering motor
7 First tie rod
8 Second tie rod
9 Coupling rod
11 First intermediate steering lever
12 Second intermediate steering lever
13 Common joint
14 Steering lever
16 Steering gear
17 Spur gear stage
20 Steering axle

The invention claimed is:

1. A steering axle for a steerable vehicle, comprising:
an axle housing;
a steering motor;
a steering gear;
a first steering knuckle hinged in the axle housing and having a first steering arm rigidly arranged on the first steering knuckle;
a second steering knuckle hinged in the axle housing and having a second steering arm rigidly arranged on the second steering knuckle;
a coupling rod having first, second, third and fourth connection points that are axially separated from each other along the coupling rod, wherein the first and the fourth connection points being located at axially opposite remote ends of the coupling rod from each other, the second connection point being located between the first and the third connection points, and the third connection point being located between the second and the fourth connection points;

a first tie rod with a first end and a second end, the first tie rod hinged at the first end to the first steering arm and hinged at the second end to the first connection point gf the coupling rod;

a second tie rod with a first end and a second end, the second tie rod hinged at the first end to the second steering arm and hinged at the second end to the fourth connection point of the coupling rod;

a first intermediate steering lever hinged at a first end to the axle housing and hinged at a second end to the second connection point of the coupling rod; and a second intermediate steering lever hinged at a first end to the axle housing and hinged at a second end to the third connection point of the coupling rod;

wherein the steering axle is configured so that the steering motor can set a steering angle of the steering axle via the steering gear.

2. The steering axle according to claim 1, wherein the steering motor and the steering gear are arranged on the axle housing coaxially with a steering axis of the first steering knuckle, and wherein an output shaft of the steering gear is connected in a rotationally fixed manner to a bearing bolt of the first steering knuckle.

3. The steering axle according to claim 1, wherein the steering motor is arranged on the axle housing coaxially with a steering axis of the first steering knuckle, wherein the steering gear is arranged in the first steering knuckle, and wherein an output shaft of the steering motor is connected fixedly in terms of rotation to an input shaft of the steering gear.

4. The steering axle according to claim 1, wherein the steering motor is arranged on the axle housing parallel to a steering axis of the first steering knuckle, the steering gear is arranged in the first steering knuckle, and an output shaft of the steering motor is connected to an input shaft of the steering gear via an intermediate gear.

5. The steering axle according to claim 4, wherein the steering motor and the steering gear are arranged on the axle housing in such a way that an axis of rotation of an output shaft of the steering gear is identical to an axis of rotation of the first intermediate steering lever, and wherein the output shaft is connected in a rotationally fixed manner to the first intermediate steering lever.

6. The steering axle according to claim 1, wherein at least the first tie rod has a circular arc shape that extends from the first end to the second end thereof.

7. The steering axle according to claim 1, wherein the first intermediate steering lever has a circular arc shape that extends from the first end to the second end thereof and the second intermediate steering lever has a circular arc shape that extends from the first end to the second end thereof, and wherein a circular outer side of the first intermediate steering lever faces a circular outer side of the second intermediate steering lever.

8. The steering axle according to claim 1, wherein the first intermediate steering lever is configured as a rigid articulated lever with an articulation tip and the second intermediate steering lever is configured as a rigid articulated lever with an articulation tip, and wherein the articulation tip of the first intermediate steering lever faces the articulation tip of the second intermediate steering lever.

9. An industrial truck comprising the steering axle according to claim 1.

\* \* \* \* \*